United States Patent Office 3,803,107
Patented Apr. 9, 1974

3,803,107
PROCESS OF COPOLYMERIZING ISOPRENE AND PROPYLENE
Adel F. Halasa, Bath, Ohio, assignor to The Firestone Tire & Rubber Company, Akron, Ohio
No Drawing. Filed Feb. 4, 1972, Ser. No. 223,749
Int. Cl. C08d 1/26, 3/10; C08f 15/04
U.S. Cl. 260—85.3 R                   10 Claims

ABSTRACT OF THE DISCLOSURE

The process disclosed herein comprises the copolymerization of isoprene with propylene. Surprisingly this process is not effective with butadiene substituted for the isoprene nor with other olefins substituted for the propylene. The catalyst comprises a combination of n-butyl lithium, or other n-alkyl lithium of 3–8 carbon atoms, with a secondary-alkyl chloride, such as sec.-butyl chloride, having 3–6 carbon atoms therein. The product is a low molecular weight elastomer which can be coupled with various coupling agents to convert the product to an elastomer of sufficiently high molecular weight for the general uses of elastomers, such as resilient coatings, pneumatic tires, etc.

BACKGROUND OF THE INVENTION

Field of the invention

The invention relates to a process for copolymerizing isoprene with propylene. More specifically it relates to a process uniquely suited to the copolymerization of isoprene and propylene catalyzed by a very specific catalyst combination. Still more specifically, it relates to such a copolymerization process in which the catalyst combination comprises an n-alkyl lithium and a secondary-alkyl chloride.

Related prior art

U.S. Pat. Nos. 3,208,982 and 3,280,082 show the use of a Zeigler catalyst to produce an elastomer from isoprene and propylene which contains a large amount of gel and the polymerization is difficult to control.

South African Pat. No. 621,162 pertains to the polymerization of conjugated dienes with an organolithium initiator in the presence of a halogen adjuvant. A very wide scope of organolithium compounds is indicated, and also a very wide range of halogen adjuvants is listed such as halogen molecules, halogenated hydrocarbons, etc. However, there is no mention of sec.-butyl chloride nor sec.-amyl chloride nor any of the other sec.-alkyl chlorides. While general reference is made to mono-lithium compounds, the invention is primarily concerned with di-lithium or other poly-lithium hydrocarbon derivatives. No mono-lithium alkanes are specified. The only mono-lithium hydrocarbons listed are aromatic compounds. It appears that only poly-lithium aliphatic compounds are used, and the aromatic compounds may be either mono- or poly-lithium. Moreover, whereas the patentee generalizes on page 10, lines 20–30, that copolymers of isoprene and of butadiene can be prepared with ethylene, propylene, 1-butene, 1-hexene and 1-octene, it has been found by the present inventor that such copolymers cannot be prepared using butadiene with any of the olefins listed, and cannot be prepared using isoprene with ethylene, 1-butene, 1-hexene and 1-octene. Furthermore, n-butyl bromide appears to be preferred as the most effective of the halogen adjuvants, whereas this particular compound is found to be entirely ineffective in the present invention.

STATEMENT OF THE INVENTION

In accordance with the present invention, it has been found that isoprene, but surprisingly not butadiene, can be copolymerized with propylene, but not with ethylene, n-butene and higher alpha olefins, in the presence of n-alkyl lithium compounds, such as n-butyl lithium and similar alkyl compounds having 3–8 carbon atoms, in combination with sec.-butyl chloride, isopropyl chloride or sec.-amyl chloride. As shown hereinafter, secondary-alkyl bromide and also primary and tertiary alkyl chlorides are ineffective for this purpose.

The ratio of catalyst components can be in the range of 1–10 moles of sec.-alkyl chloride per mole of lithium alkyl, and preferably 1–5 moles per mole of lithium compound.

The ratio of catalyst to monomer can be in the range of 0.1–10 gram millimoles of n-alkyl lithium per 100 grams of monomer, preferably 0.2–1 millimole per 100 grams of monomer. This may be varied even more if lower molecular weight products can be tolerated. Moreover, the optimum amount may vary according to the polymerization temperature. The catalyst is preferably added in hexane solution having a concentration of about 0.75 mole per liter.

The monomer solution concentrations are not critical, but for obvious practical purposes it is preferable not to use excessive amounts of solvent. The preferred solvents for the polymerization are inert hydrocarbons such as butane, hexane, heptane, benzene and toluene. The polymerization is preferably conducted in a closed reaction vessel and all operations are carried out in an inert atmosphere such as nitrogen. For best results polymerization should be carried out at temperatures of 5–100° C. and preferably from 30 to 80° C.

For small scale laboratory preparations, the polymerization reactions may be conveniently carried out in glass bottles sealed by crown caps. These crown caps have several openings covered by a rubber film with an inner aluminum foil lining. Before use, the bottles should be dried, for instance by flaming with helium, argon or other inert gas.

An atmosphere of inert gas such as helium, argon or the like is preferably maintained in the bottle during the charging to avoid contact of oxygen with the monomers. The isoprene is charged as a solution in hexane, generally about 15–25% concentration. With the temperature maintained sufficiently low to avoid substantial vaporization. The bottle is then charged with the appropriate amount of propylene and capped. The bottles are weighed and then the catalyst combination is charged under pressure. This is introduced by means of a hypodermic syringe, the needle of which is inserted in one of the openings in the crown seal and pushed through the rubber liner. The hypodermic syringe is a convenient instrument for handling the catalyst since it keeps the catalyst out of contact with the atmosphere. The sealed bottle may be placed either on a polymerizer wheel, arranged to dip and revolve in a water bath at the desired polymerization temperature, or after brief shaking or other agitation to mix the catalyst with the other ingredients, the bottle may be allowed to stand quiescent in a medium maintained at he desired polymerization temperature.

The polymerization will usually be completed in from 3 to 60 hours, depending on the temperature, catalyst concentration and other pertinent conditions. It is usually necessary to cut open the bottle to remove the polymer. Since the polymer contains no antioxidants, it is extremely susceptible to oxidation. A preferred method of shielding the polymer from oxidation consists in dropping it into a methanol, isopropanol or other alcoholic solution of an antioxidant and agitating the mixture. The alcohol serves as a vehicle for distributing the antioxidant, as an agent to destroy the catalyst, protects the polymer from exposure to air, and causes the polymer to separate out from the solvent used in the polymerization mass. The precipitated polymer is stirred in the methanol, separated therefrom and then washed with water, usually with the addition of further stabilizing agents, and dried.

On the basis of the combined weight of isoprene and propylene, there is advantageously at least 5% propylene in the monomer mixture, and while even larger amounts of propylene can be present there is generally no advantage in having more than 60% present, and preferably about 10–40% is used.

Corresponding techniques are used in large scale polymerizations. Usually the reaction will be carried out in a closed autoclave, provided with a heat transfer jacket and with a rotary agitator. Avoidance of oxygen contamination is most easily achieved by evacuating the vessel prior to charging the monomer and solvent, and evaporating and venting a portion of the charge to sweep out any trace of oxygen present. As a precaution for the purity of the monomer and solvent, a silica gel or other suitable adsorption column is preferably inserted in the charging line for these materials. The catalyst is preferably charged last, conveniently from an auxiliary charging vessel pressured with an inert gas and communicating with the polymerization vessel through a valved conduit. It is desirable to provide a reflux condenser to assist in the regulation of the reaction temperatures, which will usually be maintained between 5° C. and 100 C., preferably between 30 and 80° C.

In referring herein to millimoles of catalyst this corresponds to millimoles of complex and also corresponds to millimoles of lithium alkyl having associated with it the secondary alkyl chloride.

The polymerization is advantageously effected in the presence of an inert diluent to facilitate handling of the polymer and to give better temperature control. Normally liquid hydrocarbons are preferred for this purpose, such as saturated aliphatic hydrocarbons, preferably of the straight chain variety, such as n-hexane, n-heptane, etc., and also benzene, toluene, etc. However, where provision is made for external heat dissipation and temperature control, the solvent can be omitted.

The dilute solution viscosity (DSV) referred to herein is defined as the inherent viscosity determined at 25° C. on a 0.4% solution of the polymer in toluene. It is calculated by dividing the natural logarithm of the relative viscosity by the percent concentration of the solution, i.e., it is the inherent viscosity measured at 0.4% concentration. The molecular weights reported herein are determined on the basis of the dilute solution viscosities.

Various methods of practicing the invention are illustrated by the following examples. These examples are intended merely to illustrate the invention and not in any sense to limit the manner in which the invention can be practiced. The parts and percentages recited therein and all through the specification, unless specifically provided otherwise, are by weight.

EXAMPLE I

Into a 28-ounce bottle is placed 500 cc. of a 17% hexane-isoprene solution containing 56 gm. isoprene. The bottles are then charged with propylene to 60 p.s.i. The catalyst is added under pressure by hypodermic syringe as described above, using 1.2 millimoles of nBuLi and 0.6 millimole of sec.-BuCl. The bottle is then placed on a polymerizer wheel and maintained at 50° C. for 18 hours. The product is recovered by precipitation in methanol as described above and represents substantially complete polymerization of the isoprene. The resultant copolymer is shown by NMR to contain 19.4% propylene and from its DSV of 0.45 it is determined to have a molecular weight of 7500.

EXAMPLE II

The procedure of Example I is repeated three times using 500 cc. of hexane solution containing 56 gm. of isoprene and each of the bottles is weighed after the propylene charge to determine the amount of propylene added. The amount of catalyst components are varied as shown in the table and the polymerizations are conducted at 80° C. for 3.5 hours to give substantially complete polymerization of the isoprene.

| mMoles of nBuLi | mMoles sec.-BuCl | Gms. propylene |
|---|---|---|
| 2.0 | 1.0 | 25 |
| 3.0 | 1.5 | 25 |
| 4.0 | 2.0 | 25 |

In each case NMR analysis shows about 20% propylene copolymerized and the molecular weights are in the range of 5,000 to 10,000 with DSV's or 0.2 to 0.5.

EXAMPLE III

The procedure of Example I is repeated a number of times using isopropyl chloride and sec.-amyl chloride respectively as the alkyl halide and in the proportions shown below.

| n-BuLi, mMoles | Alkyl halide | | Percent propylene in polymer |
|---|---|---|---|
| | Type | mMoles | |
| 3 | Sec.-amyl Cl | 10 | 20 |
| 4 | do | 10 | 20 |
| 5 | do | 10 | 20 |
| 3 | Isopropyl Cl | 10 | 20 |
| 4 | do | 10 | 20 |
| 5 | do | 10 | 20 |

In each case the conversion of isoprene is approximately 100% and the molecular weights are in the range of 5,000–10,000.

EXAMPLE IV

The procedure of Example I is repeated a number of times using the same proportions and polymerization conditions except that the catalyst components, proportions and propylene copolymerization results are as shown in the table below. In each case the isoprene conversion is approximately 100%.

| n-BuLi, mMoles | Alkyl halide | | Percent propylene in polymer (by NMR) |
|---|---|---|---|
| | Type | mMoles | |
| 3.0 | nBuCl | 10.0 | 0 |
| 3.0 | nBuCl | 5.0 | 0 |
| 3.0 | nBuCl | 12.0 | 0 |
| 3.0 | nBuBr | 5.0 | 0 |
| 3.0 | nBuBr | 10.0 | 0 |
| 3.0 | nBuBr | 12.0 | 0 |
| 3.0 | tBuCl | 6.0 | 0 |
| 3.0 | tBuCl | 12.0 | 0 |

EXAMPLE V

The procedure of Example II is repeated using n-Amyl Li in place of the N-BuLi as follows:

| mMoles n-AmLi | mMoles sec.-BuCl | Gms. propylene |
|---|---|---|
| 2 | 1 | 25 |
| 3 | 1.5 | 25 |
| 2 | 2 | 25 |

In each case NMR analysis shows about 20% propylene copolymerized and the molecular weights of the products are in the range of 5,000–10,000.

EXAMPLE VI

The procedure of Example I is repeated using a large batch size using 100 parts isoprene, 62 parts propylene, 4.5 millimoles of n-BuLi and 4.5 millimoles of sec.-BuCl. The isoprene is completely converted to polymer. A sample of the product is removed and the polymer recovered therefrom for analysis. NMR analyses shows 20% propylene in the copolymer product, and it has a DSV of 0.50. Before the remainder of the product solution is deactivated, there is added 0.5 millimole of $CCl_4$ per 100 parts of initial isoprene and the mixture heated at 50° C. for 2 hours. The resultant coupled polymer is processed and found to have a DSV of 1.4. When this is compounded in a standard formulation for this purpose it produces an elastomeric composition suitable for tire fabrication.

EXAMPLE VII

The procedure of Example I is repeated a number of times using the following components and proportions:

| Alkyl Li | | Alkyl halide | | Propylene, gms. | Isoprene, gms. |
|---|---|---|---|---|---|
| Type | mMoles | Type | mMoles | | |
| n-BuLi | 1.0 | n-BuBr | 1.0 | 28 | 45 |
| nBuLi | 2.0 | n-BuBr | 2.0 | 28 | 45 |
| n-BuLi | 1.0 | Sec.-BuBr | 1.0 | 28 | 45 |
| n-BuLi | 2.0 | Sec.-BuBr | 2.0 | 28 | 45 |

In each case the polymer product shows substantially complete conversion of the isoprene and the NMR analysis shows practically no propylene in the polymer.

EXAMPLE VIII

The procedure of Example I is repeated a number of times using the components and proportions tabulated below:

| n-BuLi, mMoles | Alkyl halide | | Propylene, gms. | Isoprene gms. |
|---|---|---|---|---|
| | Type | mMoles | | |
| 3.00 | Sec.-BuCl | 10.0 | 65 | 56 |
| 4.00 | Sec.-BuCl | 10.0 | 65 | 56 |
| 5.00 | Isopropyl Cl | 10.0 | 65 | 56 |
| 6.50 | do | 4.0 | 65 | 56 |

In each case the polymer product shows substantially complete conversion of the isoprene and the NMR analysis shows approximately 20% propylene in the polymer.

EXAMPLE IX

The procedure of Example I is repeated a number of times using the components and proportions tabulated below:

| n-BuLi, mMoles | Alkyl halide | | Propylene, gms. | Isoprene, gms. |
|---|---|---|---|---|
| | Type | mMoles | | |
| 0.250 | n-BuCl | 12.0 | 34 | 56 |
| 0.603 | n-BuCl | 2.0 | 34 | 56 |
| 1.00 | t-BuCl | 3.0 | 34 | 56 |
| 2.00 | t-BuCl | 10.0 | 34 | 56 |

In each case the polymer product shows substantially complete conversion of the isoprene and the NMR analysis shows practically no propylene in the polymer.

The invention claimed is:

1. The process of copolymerizing propylene and isoprene comprising the steps of bringing a mixture thereof containing at least 5 percent by weight of propylene based on the combined weight of isoprene and propylene into intimate contact with a catalyst combination consisting essentially of an n-alkyl lithium having 3–8 carbon atoms and a secondary alkyl chloride of 3–8 carbon atoms at a temperature in the range of 5–100° C. for a period of 3–60 hours, said n-alkyl lithium being used in a proportion of 0.1–10 gram millimoles per 100 grams of isoprene and said secondary alkyl chloride being used in a proportion of 1–10 gram millimoles per gram millimole of said n-alkyl lithium.

2. The process of claim 1 in which the monomer mixture comprises 60–90 percent by weight of isoprene and 10–40 percent by weight of propylene based on the combined weight of isoprene and propylene.

3. The process of claim 1 in which said n-alkyl lithium is n-amyl lithium.

4. The process of claim 1 in which said n-alkyl lithium is n-butyl lithium.

5. The process of claim 4 in which said secondary alkyl chloride is secondary butyl chloride.

6. The process of claim 5 in which said polymerization is conducted in a hydrocarbon solvent.

7. The process of claim 6 in which said solvent is hexane.

8. The process of claim 7 in which said temperature is 30–80° C.

9. The process of claim 8 in which there are 1–5 millimoles of sec.-butyl chloride per millimole of n-butyl lithium.

10. The process of claim 9 in which there are 0.1–1.0 millimole of n-butyl lithium per 100 grams of isoprene.

References Cited

UNITED STATES PATENTS 3,280,082  10/1966  Natta et al. _____ 260—85.3 R
3,065,218  11/1962  Greene _____ 260—85.3 R

FOREIGN PATENTS 876,587  9/1961  Great Britain _____ 260—85.3

OTHER REFERENCES

Immergut et al.: Die Makromolekulare Chemie, 41, p. 9–16 (1960).

JOSEPH L. SCHOFER, Primary Examiner
A. HOLLER, Assistant Examiner

UNITED STATES PATENT OFFICE
CERTIFICATE OF CORRECTION

Patent No. 3,803,107      Dated April 9, 1974

Inventor(s) Adel F. Halasa

It is certified that error appears in the above-identified patent and that said Letters Patent are hereby corrected as shown below:

Column 2, Line 7, "bromide" should be --bromides--.

Column 2, Line 58, "ne" should be --the--.

Column 3, Line 27, "100 C." should be --100°C.--.

Column 4, Line 16, "or" should be --of--.

Signed and sealed this 10th day of September 1974.

(SEAL)
Attest:

McCOY M. GIBSON, JR.            C. MARSHALL DANN
Attesting Officer               Commissioner of Patents